United States Patent
Mochalin et al.

(10) Patent No.: US 12,509,351 B2
(45) Date of Patent: Dec. 30, 2025

(54) DISAGGREGATION OF NANODIAMOND PARTICLES

(71) Applicants: The Curators of the University of Missouri, Columbia, MO (US); Daicel Corporation, Osaka (JP)

(72) Inventors: Vadym Mochalin, Tokyo (JP); Atsushi Kume, Tokyo (JP); Yoshihiro Inamoto, Tokyo (JP); Masumi Hashimoto, Tokyo (JP)

(73) Assignees: The Curators of the University of Missouri, Columbia, MO (US); Daicel Corporation, Osaka (JP)

( * ) Notice: Subject to any disclaimer, the term of this patent is extended or adjusted under 35 U.S.C. 154(b) by 806 days.

(21) Appl. No.: 17/634,883

(22) PCT Filed: Aug. 13, 2020

(86) PCT No.: PCT/US2020/046128
§ 371 (c)(1),
(2) Date: Feb. 11, 2022

(87) PCT Pub. No.: WO2021/030559
PCT Pub. Date: Feb. 18, 2021

(65) Prior Publication Data
US 2022/0324713 A1 Oct. 13, 2022

Related U.S. Application Data

(60) Provisional application No. 62/885,901, filed on Aug. 13, 2019.

(51) Int. Cl.
*C01B 32/28* (2017.01)

(52) U.S. Cl.
CPC .......... *C01B 32/28* (2017.08); *C01P 2002/72* (2013.01); *C01P 2002/82* (2013.01); *C01P 2004/64* (2013.01)

(58) Field of Classification Search
None
See application file for complete search history.

(56) References Cited

U.S. PATENT DOCUMENTS

| | | |
|---|---|---|
| 2010/0069567 A1 | 3/2010 | Petrov et al. |
| 2013/0121909 A1 | 5/2013 | Petrov et al. |
| 2015/0038593 A1 | 2/2015 | Gogotsi et al. |

(Continued)

FOREIGN PATENT DOCUMENTS

| | | |
|---|---|---|
| CN | 107840332 A | 3/2018 |
| JP | S50105590 A | 8/1975 |
| JP | 2006273704 A | 10/2006 |

OTHER PUBLICATIONS

Shenderova et al.; Surface Chemistry and Properties of Ozone-Purified Detonation Nanodiamonds; J. Phys. Chem. C, 115, 9827-9837; 2011.*

(Continued)

*Primary Examiner* — Guinever S Gregorio
(74) *Attorney, Agent, or Firm* — Stinson LLP

(57) ABSTRACT

Methods for disaggregating nanodiamond clusters, for example, by using sonication to break apart nanodiamond aggregates in an aqueous slurry having an alkaline pH. Compositions, such as aqueous nanodiamond dispersions and dry particulate compositions can be produced using these methods.

20 Claims, 5 Drawing Sheets

(56) References Cited

U.S. PATENT DOCUMENTS

| | | |
|---|---|---|
| 2016/0068398 A1 | 3/2016 | Myllymaki et al. |
| 2017/0355604 A1* | 12/2017 | Kwon .................... B02C 19/18 |
| 2018/0134563 A1 | 5/2018 | Mochalin et al. |

OTHER PUBLICATIONS

Kuznetsov et al.; Electrical Resistivity of Graphitized Ultra-Disperse Diamond and Onion-Like Carbon; Chemical Physics Letters; 397-404; 2001.*

Apatiga, L.M., et al. "Selective Oxidation of Graphite on Diamond Films Induced by UV Exposure," (2002), Inorganic Materials, vol. 38, No. 1, pp. 31-33.

Boehm, H.P., et al., "Surface Oxides of Carbon," (1964), Angewandte Chemie International Ed. In English, vol. 3, pp. 669-677.

Costa, G., et al. "Thermochemistry of Nanodiamond Terminated by Oxygen Containing Functional Groups," (2014), Carbon, vol. 80, pp. 544-550.

Danilenko, V., "On the History of the Discovery of Nanodiamond Synthesis," (2004), Physics of the Solid State, vol. 46, pp. 595-599, Abstract only.

Etzold, B.J., et al. "Layer-by-Layer Oxidation for Decreasing the Size of Detonation Nanodiamond," (2014), Chemistry of Materials, vol. 20, pp. 3479-3484, Abstract only.

Giammarco, J., "The Adsorption of Tetracycline and Vancomycin Onto Nanodiamond with Controlled Release," (2016), Journal of Colloid and Interface Science, vol. 468, pp. 253-261.

Gibson, N., et al. "Colloidal Stability of Modified Nanodiamond Particles," (2009), Diamond and Related Materials, vol. 18, Issue No. 4, Abstract only.

Inkyo, M., et al. "Experimental Investigation of Nanoparticle Dispersion by Beads Milling with Centrifugal Bead Separation," (2006), Journal of Colloid and Interface Science, vol. 304, pp. 535-540.

Krueger, A., "Deagglomeration and Functionalisation of Detonation Diamond," (2007), Physica Status Solidi (A) Applications and Materials Science, vol. 204, Issue No. 9, pp. 2881-2887, Abstract only.

Krueger, A., et al. "Functionality is Key: Recent Progress in the Surface Modification of Nanodiamond," (2012), Advanced Functional Materials, vol. 22, No. 5, pp. 890-906, Abstract only.

Kruger, A., et al. "Unusually Tight Aggregation in Detonation Nanodiamond: Identification and Disintegration," (2005), Carbon, vol. 43, Issue 8, pp. 1722-1730.

Lai, Lin, et al. "Modeling the Thermostability of Surface Functionalisation by Oxygen Hydroxyl, and Water on Nanodiamonds," (2011), Nanoscale, vol. 3, pp. 2566-2575.

Liang, Y., et al. "A General Procedure to Functionalize Agglomerating Nanoparticles Demonstrated on Nanodiamond," (2009), American Chemical Society Nano, vol. 3, Issue No. 8, pp. 2288-2296, Abstract only.

Mandzy, M., et al. "Breakage of TiO2 Agglomerates in Electrostatically Stabilized Aqueous Dispersions," (2005), Powder Technology, vol. 160, pp. 121-126.

Mochalin, V.N., et al. "Contribution of Functional Groups to the Raman Spectrum of Nanodiamond Powders," (2009), Chemistry of Materials, vol. 21, pp. 273-279.

Mochalin, V.N., et al. "Adsorption of Drugs on Nanodiamond: Toward Development of a Drug Delivery Platform," (2013), Molecular Pharmaceutics, vol. 10, No. 10, pp. 3728-3735, Abstract only.

Mochalin, V.N., et al. "The Properties and Applications of Nanodiamonds" (2012), Nature Nanotechnology, vol. 7, pp. 11-23.

Mochalin, V.N., et al. "Covalent Incorporation of Aminated Nanodimaond into an Epoxy Polymer Network," (2011) American Chemical Society Nano, vol. 5, pp. 7494-7502, Abstract only.

Mochalin, V.N., et al. "Nanodiamond-Polymer Composites," (2015), Diamond and Related Materials, vol. 58, pp. 161-171.

Mochalin, V.N., et al. "Wet Chemistry Route to Hydrophobic Blue Fluorescent Nanodiamond," (2009), Journal of the American Chemical Society, vol. 131, No. 13, pp. 4594-4595.

Muller, F., et al. "Dispersing Nanoparticles in Liquids," (2004), International Journal of Mineral Processing, vol. 74S, pp. S31-S41.

Nunn, N., et al. "Toward a Golden Standard in Single Digit Detonation Nanodiamond," (2016), Physica Status Solidi (a), vol. 213, Issue 8, pp. 2138-2145, Abstract only.

Osawa, E. "Monpodisperse Single Nanodiamond Particulates," (2008), Pure Appl. Chem., vol. 80, No. 7, pp. 1365-1379.

Osawa, E. et al. "Consequences of Strong and Diverse Electrostatic Potential Fields on the Surface of Detonation Nanodiamond Particles," (2009), Diamond & Related Materials, vol. 18, pp. 904-909.

Osswald, S., et al. "Control of sp2/sp3 Carbon Ratio and Surface Chemistry of Nanodiamond Powders by Selective Oxidation in Air," (2006), Journal American Chemical Society, vol. 128, No. 35, pp. 11635-11642, Abstract only.

Osswald, S., et al. "Increase of Nanodiamond Crystal Size by Selective Oxidation," (2008), Diamond and Related Materials, vol. 17, Issues 7-10, pp. 1122-1126, Abstract only.

Osswald, S., et al. "Phonon Confinement Effects in the Raman Spectrum of Nanodiamond," (2009), The American Physical Society, Physical Review B; vol. 80, pp. 075419-1-075419-9.

Peng, K., et al. "Room Temperature Functionalization of Carbon Nanotubes Using an Ozone/Water Vapor Mixture," (2011), Carbon, vol. 49, Issue No. 1, pp. 70-76, Abstract only.

Pentecost, A. "Deaggregation of Nanodiamond Powders Using Salt- and Sugar-Assisted Milling", (2010), ACS Applied Materials & Interfaces, vol. 2, No. 11, pp. 3289-3294.

Petrov, I., et al. "Detonation Nanodiamonds Simultaneously Purified and Modified by Gas Treatment," (2007), Diamond & Related Materials, vol. 16, pp. 2098-2103, Abstract only.

Reineck, P., "Visible to Near-IR Fluorescence From Single-Digit Detonation Nanodiamonds: Excitation Wavelength and pH Dependence," (2018), Scientific Reports, vol. 8, No. 2478.

Schmidlin L., et al., "Identification, Quantification and Modification of Detonation Nanodiamond Functional Groups," (2012), Diamond and Related Materials, vol. 22 pp. 113-117.

Setyawati, M.I., et al. "Tuning Endothelial Permeability with Functionalized Nanodiamonds" (2015), American Chemical Society Nano, vol. 10, No. 1, pp. 1170-1181, Abstract only.

Shenderova, O., et al. "Modification of Detonation Nanodiamonds by Heat Treatment in Air," Diamond and Related Materials, vol. 15, Issues 11-12, pp. 1799-1803, abstract only.

Shenderova, O., et al. "Surface Chemistry and Properties of Ozone-Purified Detonation Nanodiamonds," (2011), The Journal of Physical Chemistry C, vol. 115, pp. 9827-9837.

Stehlik, S., et al. "High-Yield Fabrication and Properties of 1.4 nm Nanodiamonds with Narrow Size Distribution," (2016), Scientific Reports, 6:38419, pp. 1-8.

Turcheniuk, K., "Salt-Assisted Ultrasonic Deaggregation of Nanodiamond," (2016), ACS Applied Materials & Interfaces, vol. 8, No. 38, pp. 25461-25468, Abstract only.

Turcheniuk, K., et al. "Adsorption Behavior and Reduction of Copper (II) Acetate on the Suraface of Detonation Nanodiamond with Well Defined Surface Chemistry," (2016), Carbon, vol. 109, pp. 98-105.

Turcheniuk, K., et al. "Biomedical Applications of Nanodiamond (Review)," (2017), Nanotechnology, vol. 28, pp. 1-27.

Williams, O., et al. "Enhanced Diamond Nucleation on Monodispersed Nanocrystalline Diamond," (2007), Chemical Physics Letters, vol. 445, pp. 255-258.

Song et al., "The Surface Funtionalization and Applications of Nanodiamonds", vol. 27, Issue 3, Materials Herald, 2013, 27(5): 14-17. English abstract only.

* cited by examiner

DISAGGREGATION OF NANODIAMOND PARTICLES

REFERENCE TO RELATED APPLICATIONS

This application is a 371 National Stage Application of PCT/US2020/046128, filed Aug. 13, 2020, which claims the benefit of U.S. Application No. 62/885,901, filed Aug. 13, 2019, the contents of which are incorporated by reference herein in their entirety.

FIELD OF THE INVENTION

This application describes methods for disaggregating nanodiamond clusters, as well as compositions produced using these methods.

BACKGROUND

Nanodiamonds have numerous useful properties, ranging from lubrication, to nanofillers for polymer and metal composites, and to medical applications. Nanodiamonds produced through a detonation process are biocompatible, inexpensive to produce, and scalable. Recently, progress in preparing aqueous dispersions of nanodiamonds has facilitated their use both in biomedical field and in polymer composites.

Many existing and potential applications in the biomedical and pharmaceutical fields, in particular, depend upon nanodiamonds having a very small average particle size. For example, nanoparticles having a particle size within the range of 10-100 nanometers can be suspended and circulate within blood, and are readily removed from the bloodstream by the kidneys. Nanoparticles smaller than 10 nanometers have several additional properties, such as the ability to penetrate the blood-brain barrier or a cell's nuclear pore complex, that are highly desirable in biomedical applications.

Unfortunately, nanodiamonds have a strong tendency to aggregate, forming strongly-bound aggregates comprising 10, 20, or even 100 or more primary nanodiamond particles. Detonation nanodiamond particles, in particular, are known to form aggregates that cannot be destroyed by traditional means such as sonication or milling. It is therefore highly desirable to develop methods of disaggregating nanodiamond clusters and obtaining single-digit nanodiamonds (i.e., single digit nanodiamonds having a diameter of smaller than 10 nanometers).

Several disaggregation methods for nanodiamond suspensions are known in the art, including ball milling, attrition milling, and bead-assisted sonic disintegration (BASD). Each of these techniques can be used to obtain single-digit nanodiamond suspensions. Unfortunately, each of the known disaggregation techniques possesses one or more significant disadvantages. For example, many known disaggregation techniques introduce impurities into the nanodiamond material, which presents a significant concern in the biomedical context. In addition, many known disaggregation methods are complex, require expensive custom-made equipment, and/or significantly increase the cost of obtaining single-digit nanodiamonds.

Recently, U.S. Patent Application Publication No. 2015/0038593, which is herein incorporated by reference, disclosed a dry media-assisted attrition milling process that utilized crystalline milling media, such as sodium chloride or sucrose, to disaggregate nanodiamond clusters. This process provided several significant improvements relative to previously known wet milling processes, which had required the use of zirconia as the milling media.

Unfortunately, the process disclosed in the '593 publication still presents a number of drawbacks that limit its usefulness in preparing disaggregated nanodiamonds for biomedical applications. In addition to being relatively expensive and costly to maintain, attrition mills use steel jars, shafts and balls, which represent sources of metal contaminants and are subjected to severe wear and corrosion during the milling process, especially in the presence of salt. As a result, nanodiamonds produced using the process described in the '593 publication are often contaminated with metal impurities, including iron and other components of the steel. While many of the metal impurities are soluble in acids, they require the use of an additional purification step that reduces the overall efficiency and adds to the cost and complexity of the process. Additionally, while the process described in the '593 publication can reduce the size of the nanodiamond aggregates down to an average diameter of 30-50 nanometers, single-digit nanodiamonds cannot be obtained unless the dispersion pH is adjusted to approximately 11 upon completion of the milling. This requires the introduction of yet another process step, and adds still more cost and complexity. U.S. Patent Application Publication No. 2018/0134563, the entire disclosure of which is expressly incorporated herein by reference, discloses disaggregating nanodiamond clusters by using ultrasound to break apart nanodiamond aggregates in a sodium chloride aqueous slurry. This salt-assisted ultrasonic disaggregation (SAUD) approach is capable of breaking detonation nanodiamond (DND) aggregates into single digit particles by ultrasonic cavitation in oversaturated salt suspensions, and eliminates the need for both expensive mills and ceramic microbeads.

BRIEF SUMMARY OF THE INVENTION

Aspects of the present invention relate to various methods of disaggregating nanodiamond clusters. In some embodiments, the method comprises (a) combining aggregated nanodiamond clusters in a liquid medium comprising a solvent, and ozone oxidized nanodiamond clusters, wherein the clusters and solvent are present in a slurry having a pH of between about 8 and about 11, such as between about 9 and about 10; and (b) sonicating the mixture for a time sufficient to produce nanodiamond particles having a median particle size less than the median particle size of the aggregated nanodiamond clusters.

In other aspects, the present invention is directed to nanodiamond particles prepared using the methods described herein. Still further aspects are directed to compositions comprising said nanodiamond particles.

Other objects and features will be in part apparent and in part pointed out hereinafter.

DETAILED DESCRIPTION

Figure 1:
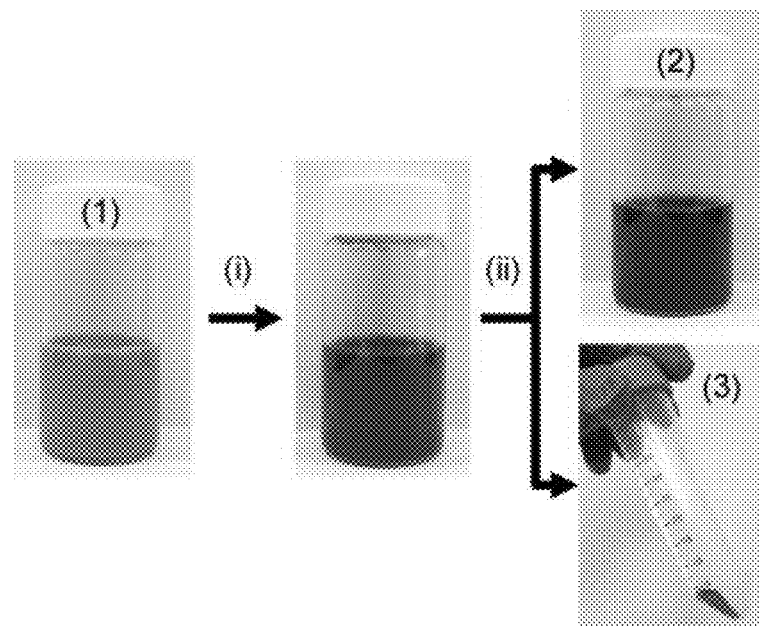
FIG. 1: Disaggregation of DND-03 and DND-02 via horn sonication. (i) pH adjustment to 9.5 followed by horn sonication for 280 min. (ii) Ultracentrifugation at 12000 rpm for 10 min. (1) DND-$O_3$ (2) S-DND-$O_3$ (3) P-DND-03.

Provided herein are methods of disaggregating (deaggregating) nanodiamond clusters. Various methods of disaggregating nanodiamond clusters comprise (a) combining aggregated nanodiamond clusters in a liquid medium comprising a solvent (e.g., water), and ozone oxidized nanodiamond clusters, wherein the clusters and solvent are present in a slurry having a pH of between about 8 and about 11, such as between about 9 and about 10; and (b) sonicating the mixture for a time sufficient to produce nanodiamond particles having a median particle size less than the median particle size of the aggregated nanodiamond clusters.

Various methods include disaggregating ozone oxidized nanodiamond clusters in alkaline water by horn sonication. The methods described herein are useful, for example, to produce compositions comprising nanodiamonds having an average particle size of less than 10 nanometers in diameter.

The methods described herein may provide a number of advantages relative to previously known methods of disaggregating nanodiamonds. For example, the method does not introduce any irremovable or difficult-to-remove contaminants into the resulting nanodiamonds—an important advantage in applications for which high purity nanodiamonds are necessary, particularly biomedical applications. The processes described herein generally do not require costly materials or expensive equipment, such as zirconia microbeads or attrition mills, and can be implemented by virtually any laboratory or scaled up for large-scale production, for instance, by employing continuous flow sonication cells. Additionally, nanodiamonds produced using the processes described herein can be dried and then redispersed to form a colloidal dispersion of nanodiamonds that retain a relatively small particle size, which represents another advantage compared to previously known disaggregation techniques.

As used herein, the terms "nanodiamond aggregates," "aggregated nanodiamonds," and "aggregated nanodiamond clusters" each refer to those nanodiamond aggregates comprising a multiplicity of primary nanodiamond particles, for example nanodiamond aggregates comprising at least 10, 20, 30, 40, 50, 100, or 1000 or more primary nanodiamond particles.

As used herein, the term "disaggregating" refers to the breaking apart of said aggregate clusters into smaller clusters (i.e., containing fewer primary particles) down to and including individual primary nanodiamond particles.

As used herein, the term "particle size" is defined as the diameter of the smallest circular hole through which a particle (which includes an aggregation of particles) can pass freely. For example, the particle size of a spherical aggregate is equivalent to the diameter of the aggregate, while the particle size of an ellipsoidal aggregate corresponds to the length of the longest minor axis.

As described above, sonication may be carried out for a time sufficient to reduce the median particle size of the nanodiamonds to within a desired range. Suitable frequency, intensity, and duration of the sonication will depend upon the desired nanodiamond particle size and the particular equipment used. For example, the period of sonication may range from about 5 minutes to about 500 minutes. The sonication may be carried out for at least about 5 minutes, about 10 minutes, about 15 minutes, about 20 minutes, about 30 minutes, or about 60 minutes. Exemplary ranges include from about 5 minutes to about 400 minutes, about 5 minutes to about 360 minutes, and about 30 minutes to about 280 minutes.

The sonication frequency may range from about 20 kHz to about 100 kHz. For example, the sonication frequency may be at least about 20 kHz, at least about 30 kHz, about 40 kHz, or about 50 kHz. Exemplary ranges include from about 20 kHz to about 80 kHz, about 20 kHz to about 60 kHz, and about 50 kHz to about 100 kHz.

The power delivered by the sonicator may range, for example, from about 50 watts to about 1500 watts. The sonication power may be at least about 100 watts, at least about 250 watts, about 500 watts, or about 1000 watts. Exemplary ranges include from about 500 watts to about 1500 watts, about 50 watts to about 1000 watts, and about 250 watts to about 1500 watts.

Nanodiamond Surface Functionalization

In the processes described herein, it can be desirable to use nanodiamonds that are purified and that are generally free of contaminants. It can be further desirable to utilize nanodiamonds that comprise hydrophilic surface groups, and in particular nanodiamonds that comprise surface carboxyl groups and acid anhydrides.

In some embodiments, the nanodiamonds comprise at least about 0.5 mmol of carboxyl groups per gram of nanodiamond, for example at least about 0.1 mmol of carboxyl groups per gram of nanodiamond, at least about 0.5 mmol of carboxyl groups per gram of nanodiamond, at least about 1 mmol of carboxyl groups per gram of nanodiamond, or at least about 2 mmol of carboxyl groups per gram of nanodiamond. For example, the nanodiamonds may comprise from about 0.1 mmol to about 10 mmol of carboxyl groups per gram of nanodiamond, from about 0.5 mmol to about 5 mmol of carboxyl groups per gram of nanodiamond, or from about 1 mmol to about 3 mmol of carboxyl groups per gram of nanodiamond.

Without being bound to a particular theory, it is believed that the processes described herein are more efficient when applied to hydrophilic nanodiamonds that have a large number of carboxyl groups on the surface.

Accordingly, the methods described herein may comprise an ozone/oxygen gas mixture oxidation step wherein the nanodiamond aggregates are purified prior to the disaggregation step. Ozone is a strong oxidizing agent selectively reacting with $sp^2$ carbon in mild conditions. Ozone oxidation of DNDs results in a high content of oxygen-containing surface groups. In contrast to air oxidation, ozone oxidation progresses at significantly lower temperatures 150 to 200° C., minimizing diamond carbon burn-off. Ozone oxidation is performed by heating the nanodiamond sample at a temperature of between about 100 to 250° C., such as 150 to 200° C. for a period of at least about 72 hours. An appropriate mixture comprises 0.1 ppm ozone in oxygen gas.

Without being bound to a particular theory, it is believed that the electrostatic repulsion provided by anionic surface groups (e.g., carboxyl groups) may assist with the disaggregation process and prevent re-aggregation of the nanodiamond particles. Surface carboxylate groups may dissociate to a greater extent than surface carboxyl groups, and may therefore provide a further enhancement of the disaggregation process.

In various embodiments, the methods described herein can further comprise graphitizing the aggregated nanodiamond clusters to remove surface functional groups and homogenize surface chemistry. In some embodiments, the methods can further comprise graphitizing the aggregated nanodiamond clusters; and oxidizing the aggregated nanodiamond clusters in the presence of ozone at a temperature of between about 100° C. and about 250° C. or between about 150° C. and about 200° C. after graphitization. In certain embodiments, the graphitizing is conducted under an inert atmosphere (e.g., a noble gas such as argon) and at a temperature of at least about 900° C. or from about 900° C. to 1000° C. (e.g., 950° C.).

pH

In a preferred embodiment, pH of the slurry is adjusted to at least about 8, such as between about 8 and about 11. In one preferred embodiment, the slurry pH is adjusted to between about 9 and about 10, such as between 9.2 and 9.8. The pH adjuster may be, for example, 9.5. In one example, the pH adjuster is 1M ammonium hydroxide solution.

Component Ratios

The concentration of the nanodiamond in the liquid medium should also be sufficiently high to enable efficient disaggregation. For example, the nanodiamond may be present in an amount of at least 10 grams per liter of the liquid medium, such as at least about 20 g/L, at least about 30 g/L, at least about 40 g/L, or at least about 50 g/L.

Particle Size Reduction

The methods described herein may be used to produce nanodiamond particles having a median particle size of less than about 50 nm, less than about 40 nm, less than about 30 nm, less than about 25 nm, less than about 20 nm, or less than about 15 nm. The nanodiamond particles have a median effective particle size of at least about 2 nm; and preferably less than 10 nm, for example less than about 9 nm, less than about 8 nm, less than about 7 nm, less than about 6 nm, or even less than about 5 nm.

As used herein, the terms "median effective particle size" and "median particle size" mean that 50% of the nanodiamond particles have a particle size of less than the stated value. The methods described herein may be used to produce nanodiamond particles wherein greater than 50% of said particles have a particle size of less than one of the values listed above. For example, at least about 60%, at least about 70%, at least about 80%, at least about 90%, at least about 95%, at least about 98%, or at least about 99% of the nanodiamond particles may have a particle size of less than one of the values listed above.

The dynamic viscosity of nanodiamond colloid may be measured by conventional methods known to those skilled in art. For example, the dynamic viscosity of a disaggregated nanodiamond slurry (slurry after sonication), prepared using the methods described herein, may range from at least about 0.8 mPa·s to 5 mPa·s at a temperature of about 25° C.

As a non-limiting example, in one series of embodiments, the methods described herein may be used to produce nanodiamond particles wherein at least about 60%, at least about 70%, at least about 80%, at least about 90%, at least about 95%, at least about 98%, or at least about 99% of said nanodiamond particles have a particle size of less than about 20 nm, such as between 2 nm and about 20 nm. In a second series of embodiments, the methods described herein may be used to produce nanodiamond particles wherein at least about 60%, at least about 70%, at least about 80%, at least about 90%, at least about 95%, at least about 98%, or at least about 99% of said nanodiamond particles have a particle size of less than about 10 nm, such as between 2 nm and about 10 nm.

The size of nanodiamond particles in a given sample may be measured by conventional particle size measuring techniques known to those skilled in the art. Non-limiting examples of suitable particle size measuring techniques include sedimentation field flow fractionation, photon correlation spectroscopy, disk centrifugation, and static and dynamic light scattering.

Nanodiamond Particles and Compositions

In other aspects, the present invention is directed to nanodiamond particles prepared using the methods described herein. Still further aspects are directed to compositions comprising said nanodiamond particles. Non-limiting examples of compositions within the scope of the invention include dry powders, aqueous dispersions, and colloidal dispersions comprising said nanodiamond particles.

For example, pharmaceutical compositions comprising nanodiamond particles prepared using the methods described herein are within the scope of the present invention.

The nanodiamonds may be characterized by a median particle size within the ranges described above. Likewise, the compositions may be characterized in that they comprise nanodiamonds having a median particle size within the ranges described above.

Aqueous dispersions of nanodiamonds prepared according to the methods described herein may be substantially free of aggregates having a particle size greater than about 250 nm, greater than about 200, greater than about 100 nm, greater than about 90 nm, greater than about 70 nm, greater than about 60 nm, or greater than about 50 nm. As used herein, the term "substantially free of aggregates" means that the dispersion comprises less than 10 vol %, for example less than 5 vol %, less than 2 vol %, or even less than 1 vol % of said aggregates, relative to the total solid volume of the nanodiamonds present in the dispersion.

Aqueous dispersions of nanodiamonds prepared according to the methods described herein may be further characterized by advantageous storage stability. For example, said aqueous dispersions may show no appreciable precipitation of the nanodiamond phase when stored for at least about 1 day, at least about 1 week, at least about 1 month, or at least about 4 months at ambient conditions.

Dry nanoparticulate compositions prepared according to the methods described herein are also within the scope of the present invention. Advantageously, dry nanodiamonds that have been disaggregated as described herein can be readily redispersed in water to form an aqueous dispersion having an only slightly larger mean particle size (e.g., a mean particle size of less than about 50 nm, less than about 40 nm, less than about 30 nm, less than about 20 nm, less than about 10 nm, or less than about 5 nm). This feature of the dry nanodiamond compositions is significantly advantageous compared to nanodiamonds prepared using prior art disaggregation techniques, where drying and subsequent redispersion resulted in the formation of aggregates having a mean particle size of 1 μm or greater.

While the text of this disclosure focuses on aggregated and disaggregated nanodiamonds, it should be appreciated that the same principles and considerations can be applied to disaggregate other hard materials.

Having described the invention in detail, it will be apparent that modifications and variations are possible without departing from the scope of the invention defined in the appended claims.

EXAMPLES

The following non-limiting examples are provided to further illustrate the present invention. Here we analyze the quantitative differences between ozone oxidized DNDs and standard high temperature gas phase oxidized DNDs in the presence of oxygen using X-ray Photoelectron Spectroscopy (XPS) and acid-base back potentiometric titration. Additionally, horn sonication in alkaline water is employed in order to investigate the potential of deaggregation of the ozone treated DNDs without milling.

3 EXPERIMENTAL PROCEDURE 3.1 Samples

All DND powders used in this study were produced by Daicel Corporation (Osaka, Japan). To produce DND, 50:50 TNT:RDX charges were detonated in $CO_2$ atmosphere and the detonation soot was purified in a mix of 70 wt % nitric acid and concentrated sulfuric acid in a 1:6 volume ratio at 150° C. for 5 hours. It was followed by multiple DI water washing and spray drying cycles. We label this material "as-received DND" hereafter. The as-received DND was oxidized at Daicel at 400° C. for 3 hours in oxygen and nitrogen gas stream (oxygen: 4%, nitrogen: 96% by volume) using a tube furnace (KTF045N1, Koyo Thermo Systems Co., Ltd). The resulting material is labeled as $DND-O_2$.

3.2 Ozone Oxidation of DNDs

Prior to ozone oxidation, as-received DND was graphitized at 950° C. for 5 hours in argon flow using a tube furnace (GSL-1800X, MTI CORPORATION) in order to remove surface functional groups and homogenize its surface chemistry. This graphitized DND powder (0.5 g) was placed into a 250 ml round bottom glass flask heated to 200° C. using electric mantle heater (HM0250VF1 HEAT MANTLES, BRISKHEAT) while continuously flowing a humid ozone/oxygen mix for 72 hours. The mix was generated by ozone generator (Ozone Generator B1065, RDEX-PAM) and flown into the reactor through an Erlenmeyer flask filled with 500 ml of DI water to provide enough humidity inside the reactor for $H_2O$ assisted ozonolysis. The sample prepared according to this protocol has been labeled as $DND-O_3$.

3.3 Sonication-Assisted Hydrolysis 0.6 g of $DND-O_3$ and $DND-O_2$ were separately mixed with DI water to 6.0 wt % slurries. The slurry pH was adjusted to 9.5 with 1M ammonium hydroxide solution. The slurries were sonicated for 280 minutes using a Fisher Scientific Model 705 Sonic Dismembrator at 50% output power (FIG. 1). To monitor the disaggregation progress in the course of sonication, 20 µl aliquots of the slurry were taken at time intervals, diluted with 6 ml of ammonium hydroxide solution (pH 9.6) and the particle size distribution of DND in the diluted aliquots was measured by DLS. Upon completion of horn sonication, the $DND-O_3$ and $DND-O_2$ slurries were centrifuged at 12000 rpm at 25° C. for 10 min using a 5810-R, Eppendorf centrifuge and supernatants from each sample were carefully collected with a pipette ($S-DND-O_3$ and S-DND-02, correspondingly). Precipitated part of $DND-O_3$ was labeled as $P-DND-O_3$ (FIG. 1). We did not collect the part which precipitated from $DND-O_2$.

3.4 Characterization 3.4.1 Fourier Transform Infrared Spectroscopy (FTIR)

FTIR spectra were measured in the range 500 to 4000 $cm^{-1}$ at 1 $cm^{-1}$ resolution using a Thermo Nicolet NEXUS 470 FT-IR spectrometer. The DND spectra were recorded in potassium bromide pellets made by pressing the mixture of 100 mg KBr and 1 mg DND under a load of 15 tons.

3.4.2 X-Ray Photoelectron Spectroscopy (XPS)

XPS measurements were performed using a PHI5800 ESCA (ULVAC-PHI Inc.) with a monochromatic AlKα X-ray source. DND samples were attached to a conductive carbon tape. To avoid potential interference from the tape, we ensured that the layer of DND is much thicker compared to the depth of XPS signal collection. The 0 to C atomic percent ratio was calculated using an average from two different high resolution scans for O1s and C1s peak areas. The high resolution scans were carried out at 58.7 eV pass energy with 0.25 eV step.

3.4.3 UV-Raman

Raman spectra were recorded using a HORIBA LabRAM HR Evolution LabSpec 6 in the Raman shift range 900 to 1900 $cm^{-1}$ with an excitation wavelength of 325 nm at 0.8 mW. The spectra were averaged over a 20×20 µm area with 36 mapping points. Each spectrum was accumulated twice with 4 seconds exposure time to minimize potential laser induced damaging to the sample.

3.4.4 Specific Surface Area (SSA) Analysis

Specific surface areas (SSA) were determined using a NOVA Surface Area Analyzer 2000e (Quantachrome Instruments). Prior to measurements a DND sample was degassed under vacuum at 200° C. for 2 hours. The SSA was calculated from nitrogen adsorption at −196° C. using the Brunauer-Emmett-Teller (BET) isotherm.

3.4.5 Acid-Base Back Potentiometric Titration

Acid-base back potentiometric titration was used to quantify carboxyl acid (COOH) groups on DND surface. 0.05 M $NaHCO_3$ aqueous solution was prepared in order to selectively neutralize COOH group. To remove dissolved $CO_2$, argon gas was bubbled through the solution at room temperature for 24 hours. Then 0.1 g of a DND sample was stirred with 15 ml of Ar purged 0.05 M $NaHCO_3$ solution over 24 hours in a sealed 50 ml plastic centrifuge tube (Karter Scientific 208L2). After reaction of 0.1 g of DND powder and 15 ml of 0.05 M $NaHCO_3$ solution de-aerated by argon gas, the supernatant was separated via centrifugation at 12000 rpm for 30 minutes. 3 ml aliquot was taken from the supernatant and diluted by 25 ml of 0.01 M $NaNO_3$ solution de-aerated by argon gas providing enough volume to immerse a pH glass electrode. $NaNO_3$ solution was employed here to maintain the same ionic strength during titration. The supernatant was separated via 30 minutes of centrifugation at 12000 rpm and titrated in a dynamic equivalent titration mode with 0.1 M (0.1002 N) HCl using 888 Titrando equipped with a pH glass electrode LL Unitrode Pt1000 and 5 ml dosing burette (Metrohm AG). As a reference, 15 ml of the $NaHCO_3$ solution was stirred for 24 hours without DND in 50 ml plastic centrifuge tube and titrated in same conditions as above. The amount of $NaHCO_3$ reacted with COOH on DND surface was determined as a difference between the equivalence points of the reference solution and the aliquot of the sample supernatant (Table 1).

The equivalent points were determined as peak positions of the first derivatives of titration curves in the range of pH 4.0 to 4.5 and averaged from 3 different measurements. COOH content was then calculated as:

$$COOH(\text{m mol/g}) = \frac{(EP_{Blank} - EP_{sample})(\text{ml}) \times N_{HCl}(\text{mol/l})}{m_{DND}(g)} \times \frac{15(\text{ml})}{3(\text{ml})} \quad (1)$$

where $EP_{Blank}$ is the equivalent point of 3 ml of blank 0.01 M $NaHCO_3$ solution, $EP_{sample}$ is the equivalent point of 3 ml of the supernatant separated from DND powder and $NaHCO_3$ mixture, $N_{HCl}$ is the normality of HCl used in the titration (0.1002), $m_{DND}$ is the mass of DND for the titration. The $NaHCO_3$ uptake calculated from 3 ml of the blank solution and the sample was multiplied by 5 (15 ml/3 ml) to obtain the total $NaHCO_3$ uptake by DND powder, which corresponds to COOH content.

TABLE 1

Titration results

| sample | $m_{DND}$ (g) | n | EP (ml) | COOH content mmol/g |
|---|---|---|---|---|
| Blank NaHCO$_3$ | — | 1 | 1.5025 | — |
| Solution | | 2 | 1.4933 | |
| | | 3 | 1.4955 | |
| As received DND | 0.1044 | 1 | 1.4645 | 0.140 |
| | | 2 | 1.4701 | |
| | | 3 | 1.4693 | |
| DND-O$_2$ | 0.1023 | 1 | 1.4397 | 0.279 |
| | | 2 | 1.4405 | |
| | | 3 | 1.4400 | |
| DND-O$_3$ | 0.1032 | 1 | 1.4042 | 0.458 |
| | | 2 | 1.3978 | |
| | | 3 | 1.4060 | |

COOH surface density was then calculated as:

$$COOH \text{ density } (\text{nm}^{-2}) = \frac{n_{(mol)} \times N_A}{m_{DND(g)} \times S_{BET(m^2/g)} \times 10^{18}} \quad (1)$$

where n is the number of moles of COOH on DND surface, $N_A$ the Avogadro number ($6.02 \times 10^{23}$ mol$^{-1}$), $m_{DND}$ (g) is the mass of DND sample used for the titration, and $S_{BET}$ (m$^2$/g) is the specific area of DND sample determined by BET measurement (multiplication by $10^{18}$ converts m$^2$ into nm$^2$).

3.4.6 Dynamic Light Scattering (DLS)

DLS (ZetasizerNano ZS, Malvern Instruments Ltd) was used to determine the particle size distribution of DND dispersions using the viscosity of water (0.82 cP) at 25° C. The distribution and the median diameter for volume distribution (Dv50) were calculated from 10 different measurements for each sample. In addition to the volume based distributions, Z-average of a diluted slurry with ammonium hydroxide solution (pH 9.6) was calculated to obtain large agglomerate size distribution by fitting the initial part of the correlation function with a single exponential decay model. The diluted slurry was bath sonicated for 5 min before DLS measurement and Z-average diameter was calculated from 3 measurements for each sample.

Figure 2:
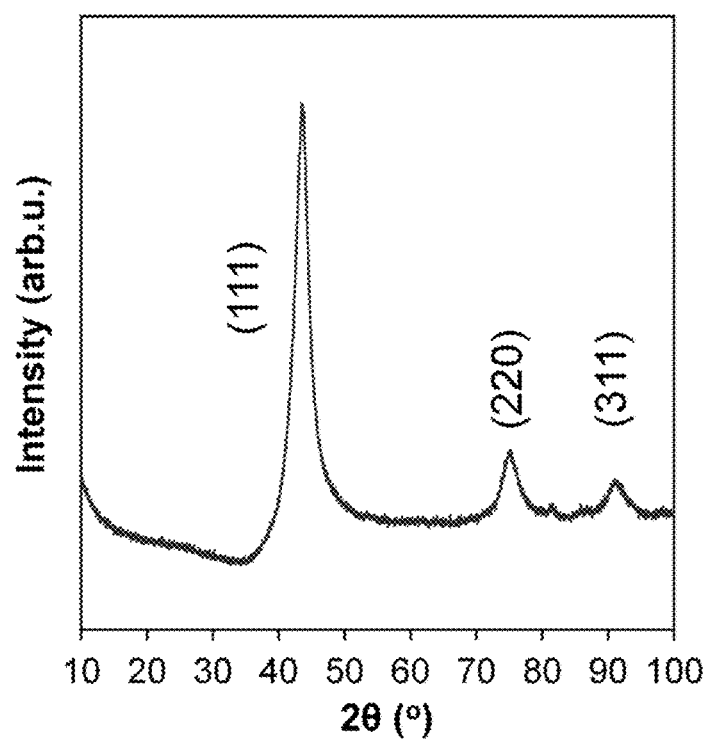
FIG. 2: XRD pattern of DND surface graphitized at 950° C. for 5 hours in argon atmosphere, showing (111), (220) and (311) peaks of diamond structure.
Figure 3:
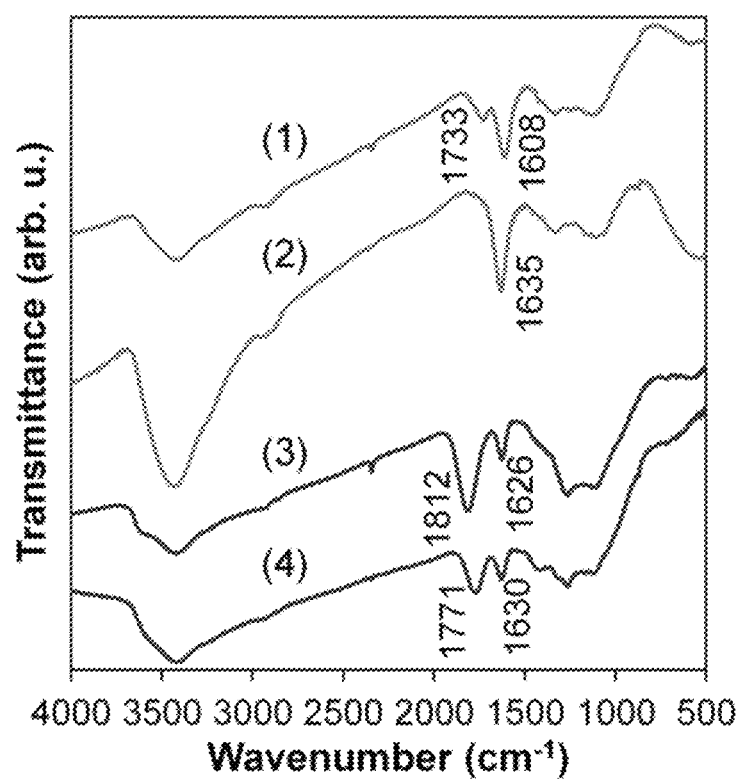
FIG. 3: FTIR of (1) As-received DND; (2) Graphitized DND; (3) DND-$O_3$; (4) DND-$O_2$.

4. RESULTS & DISCUSSION 4.1 Functionalization and Characterization of the DND Surface To minimize the content of functional groups and create a more uniform surface before ozone oxidation, as-received DND was partially graphitized at 950° C. for 5 hours in argon atmosphere with the yield of 82.2 wt %. The partially graphitized DND still largely retained its diamond structure, according to XRD (FIG. 2). Surface chemistry of the as-received and modified DNDs was characterized by FTIR in FIG. 3. The spectrum of as-received DND (FIG. 3 spectrum (1)) reveals bands of oxygen containing surface groups, corresponding to O—H stretching (3200-3600 cm$^{-1}$) and bending (1620-1630 cm$^{-1}$) vibrations, as well as C═O stretching vibration at 1700-1865 cm$^{-1}$. Surface graphitization resulted in disappearance of the carbonyl band at 1733 m$^{-1}$, however the OH bands remained (FIG. 3 spectrum (2)). Further oxidation of the surface graphitized DND in ozone/oxygen re-introduced C═O containing groups on the surface (FIG. 3 spectrum (3)), however, in contrast to DND-O$_2$ showing C═O peak at 1771 cm$^{-1}$ (FIG. 3 spectrum (4)), the C═O peak in DND-O$_3$ is shifted to a higher frequency 1812 cm$^{-1}$, indicative of anhydride groups (C═O>1800 cm$^{-1}$). Moreover, the FTIR spectrum of DND-O$_3$ shows a significantly higher intensity of the C═O peak at 1812 cm$^{-1}$ relative to O—H bending peak at 1626 cm$^{-1}$.

Acid-base back potentiometric titration and XPS measurements were performed to quantify the content of surface COOH groups in DNDs. As shown in Table 2, the experimentally determined surface density of COOH in DND-O$_3$ reaches 0.927 nm$^{-2}$, almost twice that of DND-O$_2$. The total oxygen content of the samples was measured by XPS. The O1s/C1s XPS ratio of DND-O$_3$ is 0.146, ~40% higher compared to DND-O$_2$. In principle, the O1s/C1s ratio may be affected by the primary particle size because the oxygen-containing surface groups are attached on DND surface, whereas carbon atoms are present both on the surface and in the core of a DND particle. However, BET measurements indicate that the SSA of DND-O$_3$ nearly equals that of DND-O$_2$, meaning that the O1s/C1s ratio represents the difference in the total oxygen content on the DND surface rather than the difference in particle size between these two samples. Thus, ozone oxidation results in a higher content of oxygen containing surface functional groups. For comparison, literature data for air oxidized DNDs at 400° C. for 24 hours, the titration revealed that the long-time air oxidation reached COOH content from 0.15 nm$^{-2}$ to 0.80 nm$^{-2}$, decreasing drastically SSA from 331 m$^2$/g to 292 m$^2$/g. At temperatures higher than 400° C., it seems that air oxidation results in producing oxygen-containing surface groups and burning off small DNDs simultaneously. Ozone oxidation is more controllable because it progresses at 200° C. and creates high content of oxygen containing functionalities, while minimizing DND burn off.

TABLE 2

Specific surface area, COOH content and density, and XPS O1s/C1s peak area ratio for DND samples.

| Sample | SSA (m$^2$/g) | COOH content (m mol/g) | COOH density (nm$^{-2}$) | O1s/C1s |
|---|---|---|---|---|
| As-received DND | 318.3 ± 2.1 | 0.140 ± 0.015 | 0.264 | 0.062 ± 0.003 |
| DND-O$_2$ | 299.8 ± 1.5 | 0.279 ± 0.002 | 0.561 | 0.105 ± 0.003 |
| DND-O$_3$ | 298.7 ± 1.8 | 0.458 ± 0.021 | 0.926 | 0.146 ± 0.004 |

4.2 Disaggregation of DNDs Via Horn Sonication

Figure 4:
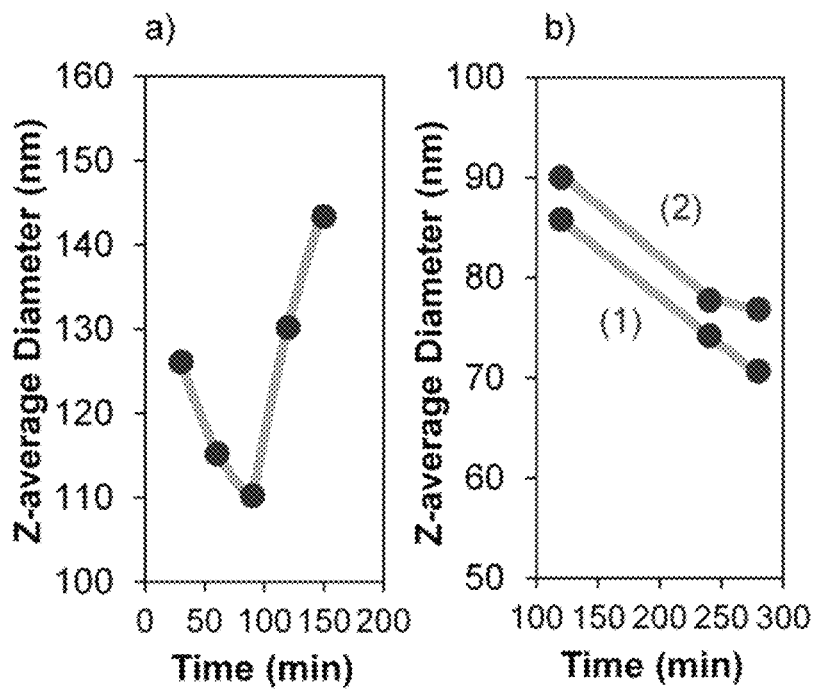
FIG. 4: a) Z-average diameter of diluted DND-$O_3$ aqueous slurry over the duration of horn sonication. b) Z-average diameter of the diluted (1) DND-$O_3$ and (2) DND-$O_2$ after centrifugation at 4500 rpm for 5 min over the duration of horn sonication. c) Photograph of (1) DND-$O_3$ and (2) DND-$O_2$ slurries after 280 min horn sonication upon turning the centrifuge tubes upside down. d) Particle size distributions of (1) S-DND-$O_3$ and (2) S-DND-$O_2$.
Figure 4:
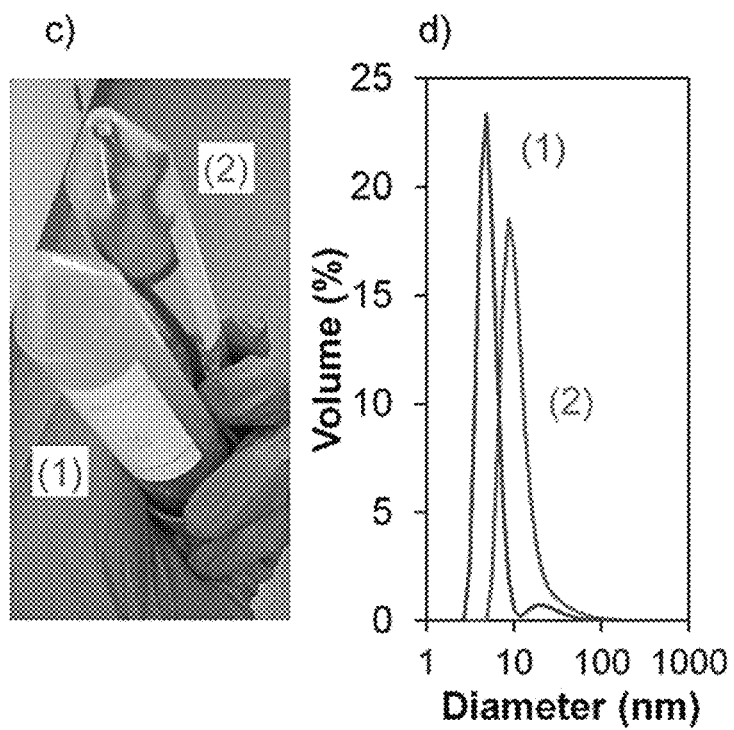

The pH of DND solution is an important factor affecting colloidal stability. At pH higher than $pK_a$, dissociation of COOH is favored resulting in a negatively charged DND surface. Therefore, we carried out horn sonication of DND-$O_2$ and DND-$O_3$ aqueous suspensions after pH adjustment to 9.5. It is well-known that excessive disaggregation processes using wet ball milling with zirconia beads or horn sonication lead to breaking up the aggregates first but then may cause re-aggregation. Re-aggregation of DNDs during BASD has also been reported. Therefore, DLS measurements were performed in order to monitor the particle size of DND during horn sonication process. FIG. 4 a shows Z-average diameter of a diluted DND-$O_3$ slurry over the duration of horn sonication. The size of larger aggregates of DND-$O_3$ has been reduced continuously for the first 90 min, but after 120 min of sonication, re-aggregation was observed. However, DLS measurements carried out after centrifugation of the slurry at 4500 rpm for 5 min to remove the larger aggregates show that disaggregation of DND-$O_3$ progressed further over 280 min of horn sonication, yielding Z-average diameter of 71 nm, whereas disaggregation efficiency of DND-$O_2$ dropped to zero after 280 min, yielding the minimal Z-average diameter of 77 nm (FIG. 4 b). Since Z-average is more sensitive to large aggregates, this experiment reveals that DND-$O_3$ has a higher re-aggregation tolerance during horn sonication. For these DLS measurements, 20 µl aliquots were diluted with 6 ml of ammonium hydroxide solution (pH 9.6) before the measurements. While doing these measurements, we noticed that the DND-$O_2$ slurry better sticks to the hydrophobic wall of a centrifuge tube, seemingly indicating a less hydrophilic character of DND-$O_2$ or an increased viscosity of the slurry (FIG. 4 c).

After 280 min of horn sonication, ultracentrifugation at 12000 rpm for 10 min was performed for each sample to fully remove large aggregates, yielding intensely dark and clear colloids (S-DND-$O_3$ and S-DND-$O_2$). Particle size distributions of S-DND-$O_3$ and S-DND-$O_2$ show sharp peaks, corresponding to Dv50 5.9 and 10.4 nm, respectively (FIG. 4 d). Moreover, Z-average diameter of the S-DND-$O_3$ and S-DND-$O_2$ diluted with ammonium hydroxide solution (pH 9.6) to 0.02 wt % is 39.2 nm for S-DND-$O_3$, which is smaller than for S-DND-$O_2$ (46.5 nm), indicating that S-DND-$O_3$ is less aggregated than S-DND-$O_2$. The horn sonication process has over 80% yield of the DND in the supernatant relative to initial DND mass and is comparable in this respect to the yield of a more expensive and laborious BASD. Thus, our results indicate that ozone oxidized DNDs can be better deaggregated than air oxidized DNDs into single digit aqueous colloids using horn sonication with ultracentrifugation without any milling media (Table 3).

Figure 5:
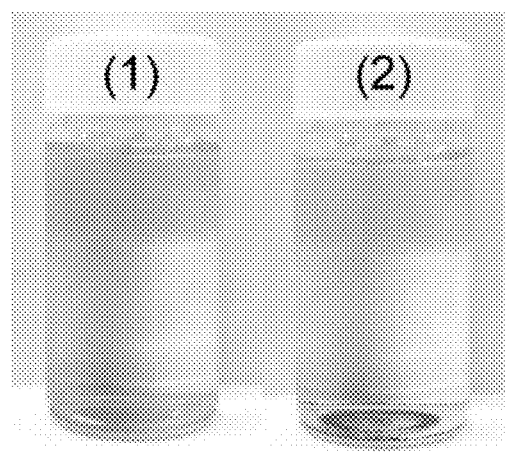
FIG. 5: Redispersibility of dried DND powders in water (0.02 wt %) without any additional treatment: (1) S-DND-$O_3$, (2) S-DND-$O_2$.
Figure 6:
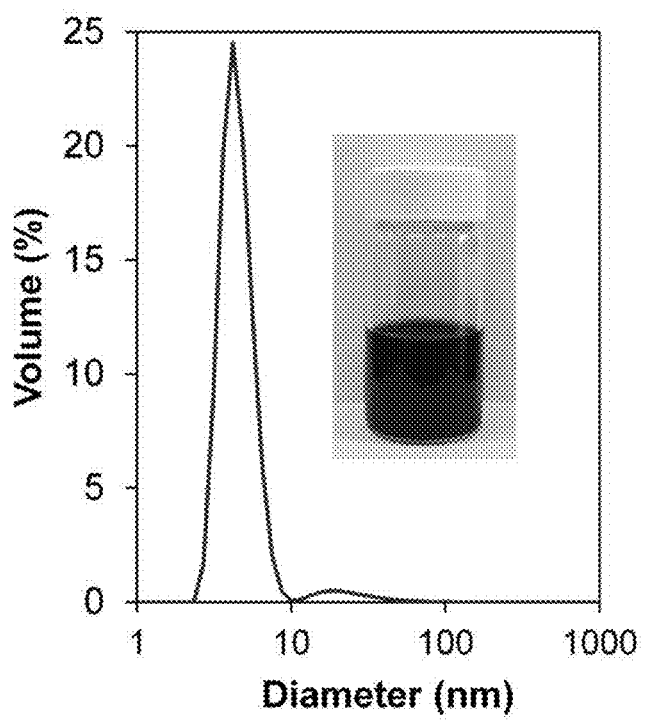
FIG. 6: Particle size distribution and photograph of re-dispersed S-DND-$O_3$ slurry from dried powder.

S-DND-$O_3$ and S-DND-$O_2$ were collected and dried using a rotary evaporator. The dry powders (4 mg each) were mixed with 20 ml of DI water (FIG. 5). Remarkably, dried S-DND-$O_3$ showed complete redispersibility in DI water without any means, whereas S-DND-$O_2$ sank and stayed at the bottom. Inspired by this observation, we prepared concentrated 6 wt % slurry from S-DND-$O_3$ powder in DI water and adjusted its pH to 9.5 with 1M ammonium hydroxide solution. After 30 min of low power bath sonication and ultracentrifugation of the slurry at 12000 rpm at 25° C. for 30 min, single digit DND aqueous colloid was recovered with over 70% yield relative to the initial mass of S-DND-$O_3$ (FIG. 6 and Table 4). Similar redispersibility from the dry state was observed for SAUD deaggregated DNDs from different manufacturers.

TABLE 3

DND concentration, Dv50, yield, and Z-average diameter.

| Sample | DND concentration (wt %) | Dv50 (nm) | Yield (wt %) | Z-average Diameter (nm) |
|---|---|---|---|---|
| S-DND-$O_3$ | 5.1 | 5.9 | 81.7 | 39.2 |
| S-DND-$O_2$ | 5.3 | 10.4 | 85.0 | 46.5 |

TABLE 4

DND concentration, Dv50, yield, and Z-average diameter.

| DND concentration (wt %) | Dv50 (nm) | Yield (wt %) | Z-average Diameter (nm) |
|---|---|---|---|
| 4.6 wt % | 5.4 nm | 74.3 wt % | 32.9 nm |

The distribution was determined by DLS using the viscosity of water (0.82 cP) at 25° C. The median diameter for a volume distribution (Dv50) was calculated from 10 different measurements. In addition to the volume based distributions, Z-average diameter of a diluted slurry (0.02 wt %) with ammonium hydroxide solution (pH 9.6) was averaged from 3 different measurements.

4.3 Characterization of S-DND-$O_3$

Figure 7:
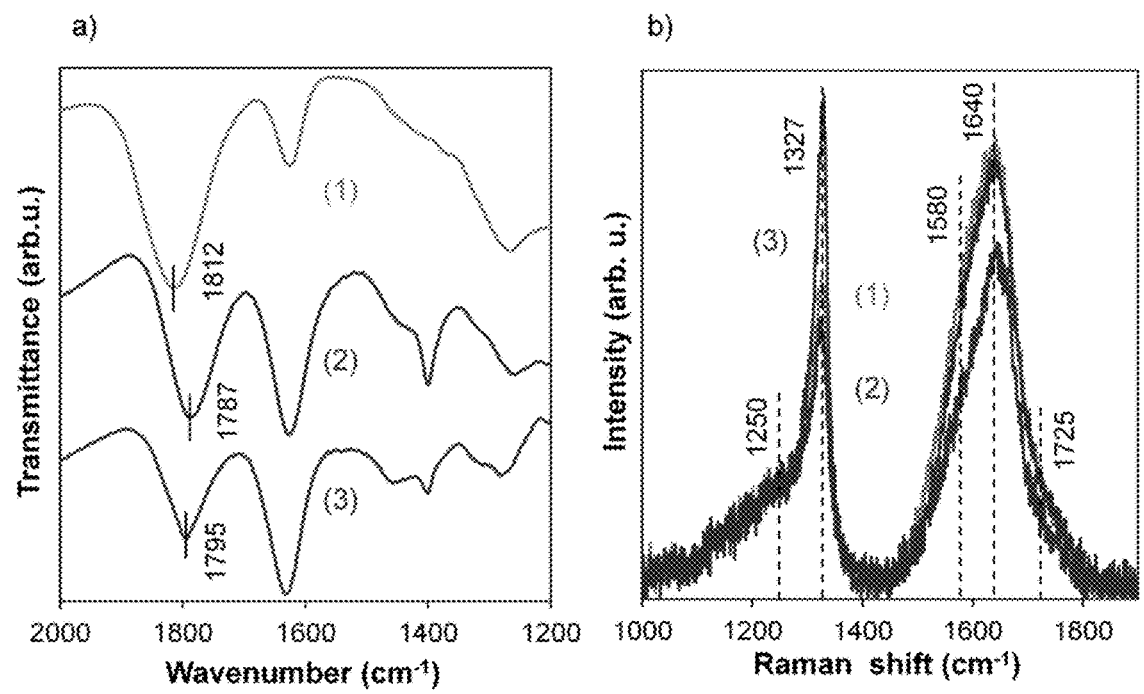
FIG. 7: a) FTIR of (1) DND-$O_3$, (2) S-DND-$O_3$, and (3) P-DND-$O_3$. b) Raman spectra of (1) DND-$O_3$, (2) S-DND-$O_3$, and (3) P-DND-$O_3$.

S-DND-$O_3$ was further investigated by UV-Raman and FTIR to reveal its structure and surface chemistry. To understand the reasons for improved dispersion stability of S-DND-$O_3$, we analyzed the differences in surface chemistry between DND-$O_3$, S-DND-$O_3$ and P-DND-$O_3$. P-DND-$O_3$ was obtained via the disaggregation process as precipitate after ultracentrifugation (FIG. 1 (3)). FTIR of S-DND-$O_3$ shows a lower frequency C=O peak (1787 $cm^{-1}$) compared to DND-$O_3$ (1812 $cm^{-1}$), indicating hydrolysis of surface acid anhydrides. Judging by the peak position, P-DND-$O_3$ is less hydrolyzed than S-DND-$O_3$ (FIG. 7 a). In addition, SSA of S-DND-$O_3$ (344 $m^2/g$) is higher than DND-$O_3$ (299 $m^2/g$), although both were obtained from the same as-received DND. The difference in SSA is related to difference in particle size, as inferred from UV Raman spectra (FIG. 7 b). The UV Raman spectra of DND-$O_3$, S-DND-$O_3$, and P-DND-$O_3$ all show contributions from smaller (1250 $cm^{-1}$) and larger (1327 $cm^{-1}$) diamond scattering domains, the G-band of graphic carbon (1580 $cm^{-1}$), O—H bending (1640 $cm^{-1}$), and C=O stretching (1725 $cm^{-1}$). P-DND-$O_3$ has a stronger diamond peak at 1327 $cm^{-1}$ relative to other samples, which could be due to a higher content of larger DND particles in the precipitate. Thus, SSA and UV Raman data indicate heterogeneous primary particle size distribution of as-received DND and confirm that horn sonication of ozone oxidized DND followed by ultracentrifugation facilitates DND fractionation. A possible explanation of this effect could be that larger primary particles of DND are less reactive towards ozone and are therefore harder to be deaggregated by horn sonication.

5 CONCLUSIONS

Ozone oxidized DNDs were investigated quantitatively by acid-base back potentiometric titration and XPS, revealing a large amount of oxygen containing surface groups in comparison to air oxidized DNDs. Moreover, the ozone oxidized DNDs have high tolerance to re-aggregation during horn sonication process, allowing longer sonication times to produce smaller particles (down to a single digit DND dispersion) without any milling media. The most prominent feature of the ozone treated and deaggregated DND is its redispersibility in water from dried powder, which originates from a large number of oxygen-containing surface groups (mainly anhydrides) produced by ozonation that were further hydrolyzed to COOH during horn sonication. The sonication-assisted hydrolysis of ozone oxidized DND is potentially a commercially viable technique to obtain single-digit COOH terminated DND colloids due to a better control, milder conditions, and a lower burn off of the smallest DND particles as compared to air oxidation.

When introducing elements of the present invention or the embodiments(s) thereof, the articles "a", "an", "the" and "said" are intended to mean that there are one or more of the elements. The terms "comprising", "including" and "having" are intended to mean that there may be additional elements other than the listed elements.

In view of the above, it will be seen that the several objects of the invention are achieved and other advantageous results attained.

As various changes could be made in the above compositions and processes without departing from the scope of the invention, it is intended that all matter contained in the above description and shown in the accompanying drawing shall be interpreted as illustrative and not in a limiting sense.

What is claimed is:

1. A method of disaggregating nanodiamond clusters, the method comprising:
    combining aggregated nanodiamond clusters in a liquid medium comprising a solvent, and ozone oxidized nanodiamond clusters to obtain a mixture, wherein the aggregated nanodiamond clusters and solvent are present in a slurry having a pH of between about 8 and about 11; and
    sonicating the mixture for a time sufficient to produce nanodiamond particles having a median particle size less than the median particle size of the aggregated nanodiamond clusters;
    wherein the nanodiamond particles have a median particle size of less than about 10 nm; and
    wherein the method further comprises graphitizing the aggregated nanodiamond clusters.

2. The method of claim 1, further comprising oxidizing the aggregated nanodiamond clusters in the presence of ozone at a temperature of between about 100° C. and about 250° C.

3. The method of claim 1 wherein the method is performed in the absence of any milling media or disaggregating agent.

4. The method of claim 1 wherein the aggregated nanodiamond clusters and solvent are present in a slurry having a pH of between about 9 and about 10.

5. The method of claim 1 wherein the nanodiamond particles have an average particle size of less than 10 nanometers.

6. The method of claim 1 wherein the nanodiamond particles have a median particle size of less than about 9 nm.

7. The method of claim 1 wherein the nanodiamond particles have a median particle size of at least about 2 nm.

8. The method of claim 1 wherein at least about 60% of the nanodiamond particles have a particle size of between about 2 nm and about 10 nm.

9. The method of claim 1 wherein the mixture is sonicated at a sonication frequency of at least about 20 kHz.

10. The method of claim 1 wherein the mixture is sonicated at a sonication frequency of from about 20 kHz to about 100 kHz.

11. The method of claim 1 wherein a sonication power is delivered to the mixture in the range of from about 50 watts to about 1500 watts.

12. The method of claim 1 wherein the nanodiamond particles comprise at least about 0.1 mmol of carboxyl groups per gram of nanodiamond.

13. The method of claim 1 wherein the nanodiamond particles comprise from about 0.1 mmol to about 10 mmol of carboxyl groups per gram of nanodiamond.

14. The method of claim 1 wherein the nanodiamond is present in the slurry in an amount of at least 10 grams per liter of the liquid medium.

15. The method of claim 1 wherein the dynamic viscosity of the slurry after sonication ranges from about 0.8 mPa·s to 5 mPa·s at a temperature of about 25° C.

16. The method of claim 1 wherein the solvent comprises water.

17. The method of claim 1 further comprising:
    oxidizing the aggregated nanodiamond clusters in the presence of ozone at a temperature of between about 100° C. and about 250° C. after graphitization.

18. The method of claim 1 wherein the graphitizing is conducted under an inert atmosphere and at a temperature of at least about 900° C.

19. The method of claim 1 wherein the ozone oxidized nanodiamond clusters are prepared by oxidation of nanodiamond clusters in the presence of a humid mixture of ozone and oxygen.

20. The method of claim 1 wherein the graphitizing is conducted under an inert atmosphere and at a temperature of from about 900° C. to 1000° C.

* * * * *